US008726270B2

(12) United States Patent
Kane

(10) Patent No.: US 8,726,270 B2
(45) Date of Patent: *May 13, 2014

(54) DISTRIBUTED INSTALLATION CONFIGURATION OVER MULTIPLE MACHINES

(75) Inventor: Travis David Kane, Mooroolbark (AU)

(73) Assignee: Google Inc., Mountain View, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/442,342

(22) Filed: Apr. 9, 2012

(65) Prior Publication Data

US 2012/0198439 A1 Aug. 2, 2012

Related U.S. Application Data

(63) Continuation of application No. 10/851,853, filed on May 21, 2004, now Pat. No. 8,156,489.

(51) Int. Cl.
*G06F 9/445* (2006.01)
(52) U.S. Cl.
USPC ........... 717/176; 717/171; 717/173; 717/174; 717/178
(58) Field of Classification Search
None
See application file for complete search history.

(56) References Cited

U.S. PATENT DOCUMENTS

| 5,742,829 | A  | * | 4/1998 | Davis et al. | 717/178 |
|---|---|---|---|---|---|
| 5,933,647 | A  | * | 8/1999 | Aronberg et al. | 717/178 |
| 6,009,274 | A  | * | 12/1999 | Fletcher et al. | 717/173 |
| 6,202,206 | B1 | * | 3/2001 | Dean et al. | 717/177 |
| 6,282,711 | B1 | * | 8/2001 | Halpern et al. | 717/175 |
| 6,615,405 | B1 | * | 9/2003 | Goldman et al. | 717/174 |
| 6,981,251 | B1 | * | 12/2005 | Kreller et al. | 717/171 |
| 6,986,133 | B2 | * | 1/2006 | O'Brien et al. | 717/173 |
| 6,990,660 | B2 | * | 1/2006 | Moshir et al. | 717/171 |
| 2002/0147974 | A1 | * | 10/2002 | Wookey | 717/176 |
| 2003/0046681 | A1 | * | 3/2003 | Barturen et al. | 717/177 |
| 2003/0163807 | A1 | * | 8/2003 | Drake et al. | 717/174 |
| 2004/0015961 | A1 | * | 1/2004 | Chefalas et al. | 717/178 |
| 2004/0044999 | A1 | * | 3/2004 | Gibson | 717/178 |
| 2004/0060035 | A1 | * | 3/2004 | Ustaris | 717/100 |
| 2004/0068723 | A1 | * | 4/2004 | Graupner et al. | 717/171 |

FOREIGN PATENT DOCUMENTS

| WO | WO 00/29962 | 5/2000 | ............ G06F 13/000 |
|---|---|---|---|
| WO | WO 03/107181 | 12/2003 | ................ G06F 9/44 |

OTHER PUBLICATIONS

Notification of Transmittal of the International Search Report and the Written Opinion of the International Searching Authority for International Application No. PCT/US2005/017577, filed May 19, 2005 (12 pages), Oct. 7, 2005.
Netsupport GMBH: "Netinstall 5.5" Netinstall,Enterprise Edition, User Guided, XP-002284204 (complete), 2002.

* cited by examiner

*Primary Examiner* — Don Wong
*Assistant Examiner* — Roberto E Luna
(74) *Attorney, Agent, or Firm* — Morris & Kamlay LLP

(57) ABSTRACT

Distributed installation configuration system and method are provided. The system and method in one aspect collects information about all products and components being installed from a centralized user interface, before the actual installation is performed, regardless of the target machine locations. The collected information is then stored centrally. Thereafter, subsequent installations, whether on the same or different machine locations, access this information for the subsequent installation procedure.

21 Claims, 5 Drawing Sheets

DISTRIBUTED INSTALLATION CONFIGURATION OVER MULTIPLE MACHINES

CROSS REFERENCE TO RELATED APPLICATIONS

This application is a continuation of U.S. application Ser. No. 10/851,853, filed May 21, 2004, by Travis David Kane and entitled "Distributed Installation Configuration System and Method", now U.S. Pat. No. 8,156,489.

TECHNICAL FIELD

This application relates generally to computer systems, and more particularly to distributed installation configuration system and method.

BACKGROUND

A suite of computer related products such as the IAM suite of products that are used for identity and access management are usually packaged and sold together. Each product in the suite typically has its own installation program, which usually needs to be run separately on the machines on which the product is being installed. Installing these products separately may entail following various rules in order for the products in the suite to be able to function properly. For example, the products in the suite may have interdependencies on one another and as such, a product may have specific installation rules that depend on whether another one of the product was installed in a certain way. Accordingly, an installation configuration tool that is enabled to provide a way for the install programs to interact with one another is desirable.

In addition, when running each product's installation program, a user may be prompted for information that the user has already provided in the course of installing another product in the suite, resulting in redundant efforts on the user's part as well as the system's part. Accordingly, an installation configuration tool that reduces duplicative efforts during installation of a suite of products is also desirable.

SUMMARY

Distributed installation configuration system and method are provided. The system, in one aspect, includes an installer module operable to collect information needed for installing a plurality of product components on one or more machines before installing the plurality of product components. A configuration agent module is operable to store and manage the collected information, the configuration agent module operable to provide data associated with the collected information. The installer module is further operable to determine whether the plurality of product components are being installed for the first time, and if the plurality of product components are being installed for the first time, the installer module is further operable to create the configuration agent module. If one or more of the plurality of product components were installed previously, the installer module is further operable to determine a location of the configuration agent module, whether on a local machine or a remote machine, and retrieve the collected information from the configuration agent module, continue with installing one or more of the plurality of product components using the collected information.

The system, in another aspect includes, but is not limited to, a user interface module operable to collect information needed to install a plurality of product components on a plurality of machines. A storage module is operable to store the collected information centrally and an installer module is operable to locate the collected information for performing installation of at least one of the plurality of product components on at least one of the plurality of machines.

In another aspect, the method includes determining whether one or more product components associated with a suite of products being installed were previously installed on one or more local or remote machines. If one or more product components associated with a suite of products being installed were previously installed, the method includes, but is not limited to, determining a location of a configuration system agent, retrieving information related to current installation being performed on a current machine from the configuration system agent, obtaining a set of localized information from a user, and installing one or more product components on the current machine using the retrieved information and the set of localized information.

If one or more product components associated with a suite of products being installed were not previously installed, the method includes, but is not limited to, obtaining information associated with all product components in the suite of products being installed, creating a configuration system agent and storing the information with the configuration system agent, and installing on a current machine one or more product components selected for the current machine using at least some of the information.

Further features as well as the structure and operation of various embodiments are described in detail below with reference to the accompanying drawings. In the drawings, like reference numbers indicate identical or functionally similar elements.

DETAILED DESCRIPTION

Figure 1:
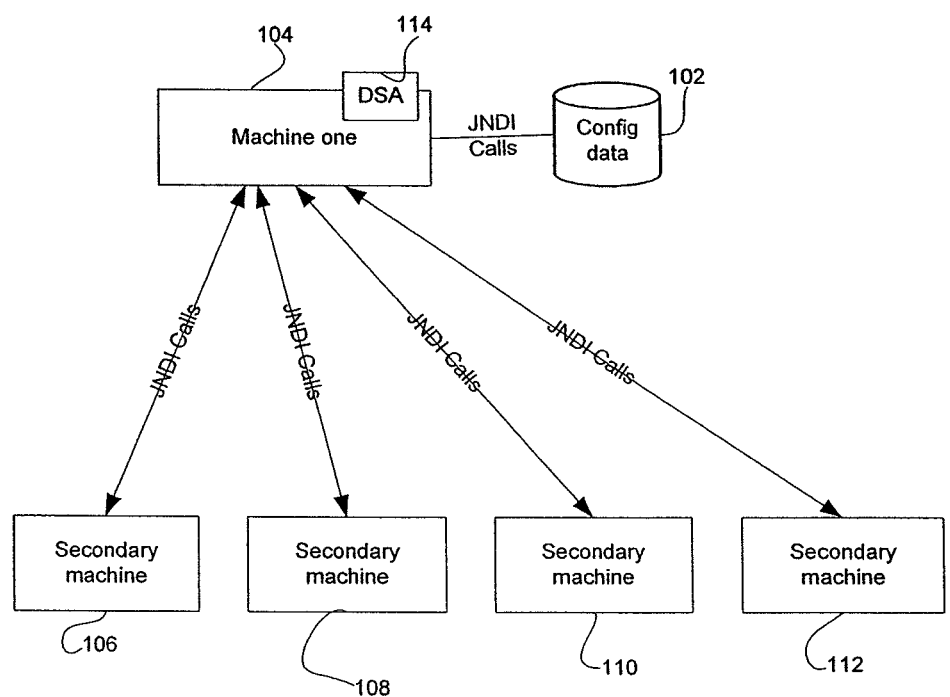
FIG. 1 is a system architectural diagram illustrating the distributed installation configuration of the present disclosure in one embodiment.

The distributed installation configuration system and method of the present disclosure, in one embodiment, allow installation of products, or suite of products, for example, that may be installed distributed among a plurality of machines or platforms. An example of such a product is IAM (identity and access management) suite of products. An IAM suite may include a set of common components and a suite of individual point products that use those common components, which may be installed across a plurality of platforms distributed in a network of machines.

For instance, a suite of products and their components function together to enable enterprises to provision and secure new web services and web-based applications to their users, as well as securing legacy applications, whether for customers/partners and/or employees.

The distributed installation configuration system and method of the present disclosure, in one embodiment, installs all common components in a suite of products and configures them for initial use, based in part on information provided by the user during the installation process. The point products may be installed by their own respective installers, for instance, run in standard interactive mode.

Common components refer to a set of products or product subcomponents that together make up the core of the a product suite such as the IAM product suite. All necessary common components need to be installed for IAM to function properly. The IAM common components are used by the IAM point products. Point products refer to individual products that can be integrated with each other via the central integration point of a product suite such as IAM. Each IAM point product makes use of the IAM common components. Typically, IAM point products need IAM common components installed to function at least in an integrated manner.

In one embodiment, an IAM product may include common components that are grouped into five "machine roles." Each machine role has a particular function in the IAM product suite, and may need several common components to co-exist to fulfill that role. For example, the five machine roles and their respective constituent common components may be: IAM Web Server installed on one machine that may include the common components such as Apache Tomcat, Java Development Kit (JDK), WAC (web access control) Tomcat Agent, and Identify and Access Manager; IAM Workflow Server installed on one more machines that may include the common components such as Apache Tomcat, Java Development Kit (JDK), Admin Object API, Admin Workflow, and Advantage Ingres (double byte); IAM Identity Server installed on one or more machines that may include common components such as Admin Server and options, and optionally Directory Backbone; IAM Access Server installed on one or more machines that may include the components such as WAC/SSO Policy Server, Access Control Service, and optionally Directory Backbone. Optionally, there may be a fifth machine role, Directory Backbone installed on one or more machines that may include the common components such as Directory and Advantage Ingres (single byte). The Directory Backbone, however, may be part of the IAM Identity Server or IAM Access Server, and accordingly, may not need a separate machine that is assigned the explicit role of Directory Backbone. In one embodiment, the above-described components in the same role go on the same machine.

An IAM Web Server machine role, in one embodiment, provides a single, web-based interface for administering the entire IAM product suite. For example, IAM Web Server includes the Identity and Access Manager (IA Manager), a Web-based GUI from which the entire IAM suite may be administered. Similar functionality present in the various products' existing legacy GUIs may be included in the IAM Web Server machine role.

An IAM Workflow Server machine role, in one embodiment, receives messages, for example, that contain requests relating to user provisioning, from the IAM Web Server. It examines each request and creates an appropriate workflow process to fulfill the request. Based on the workflow process it has established, the IAM Workflow Server sends appropriate messages to the IAM Identity Server. In one embodiment, the messages that the IAM Workflow Server receives from the IAM Web Server are in native Admin format, for example, a standard CSV format (comma separated value), and the messages it sends to the IAM Identity Server are in standard LDAP (lightweight directory access protocol) format. An Admin Object API is used to perform translation between these formats. Briefly. LDAP is communications protocol that allows a user to communicate with a directory service.

An IAM Identity Server machine role receives messages from the IAM Workflow Server and routes them to the appropriate IAM products, for example, using the relevant Admin product plug-in. An IAM Access Server machine role controls user access to the IAM product suite via the IAM Web Server by performing user authentication and resource authorization.

Directory Backbone refers to a collection of one or more interconnected directory system agents (DSAs) that together provide a unified directory service. Directory system agent (DSA), for instance, is the X.500 term for a directory server, which is a system that holds directory information.

The concept of machine roles defines groups of common components that are to be installed on the same machine. This does not exclude the possibility that a single machine can have several different roles. For example, a machine assigned the role of IAM Identity Server or IAM access server may implicitly function in the role of Directory Backbone also. Further, in one embodiment, all the roles, can be duplicated over multiple machines to provide load balancing and failover for those roles.

The various machine roles may be distributed as widely as possible. The machine roles may also be installed on a single machine or any other combination of number of machines.

Referring to the above-described common components that are part of the machine roles, Apache Tomcat refers to a servlet container that implements Sun's Java Servlet and JavaServer Pages technologies. Tomcat is developed by the Apache Software Foundation's Jakarta Project. WAC Tomcat Agent refers to a WAC (web access control) Service web agent that helps manage user access via the IAM Web Server, for example, by enabling the IAM Web Server on which it is running, to interact with other servers. Identity and Access Manage in one embodiment is a Web-based GUI with an extensible architecture that provides a single, web-based interface for administering the entire IAM product suite.

A Directory Service, in one embodiment is a centralized set of tables of data, persistently stored, that contains characteristics associated with files and other real objects. A directory service also may include the services that manage the data in the tables. It uses a single naming convention and can be referred to as a namespace. A Namespace is a directory service that uses a particular syntax for naming conventions. Examples include, but are not limited to:

Windows NT: //MyWorkstation/MyName
LDAP: //MyServer/C=US/O=MS/CN=MyName
NDS: //Planets/O=Mars/OU=DEV
NetWare 3.x: //Docs/MyNw3xPrinter Admin Object API may be an Enterprise Java Bean middleware layer that is used for the SPML (Service Provisioning Markup Language) server. SPML is used for cross-organization control of access control. SPML is XML-based expression syntax for the query and exchange of user, account, and resource provisioning requests. IAM Web GUI may be enabled to communicate to this layer. Admin Object API provides local and remote interfaces to the functionality of products in the IAM suite. This API helps clients to interface to API suite of products without having to know the details of the Admin architecture and LDAP (lightweight directory access protocol) server.

Admin Workflow is a component of an IAM product, such as Admin Service that manages administrative functionalities. Its function is to establish an appropriate workflow process whenever a user in the enterprise makes a request that requires any change(s) to be made with respect to user provisioning.

A router DSA is a DSA that is not connected to a database, but simply forwards requests to one or more other DSAs. WAC/SSO Policy Server is a component of IAM product that provides web access control. An example of such a product is Web Access Control Service. WAC Policy Server provides user authentication and resource authorization.

The Directory, a directory product, may also include a component referred to as DXtools that comprise a flexible set of utilities that facilitate interaction with external data systems. DXtools may also include a subset of database tools for managing the databases such as Ingres™ databases, used for the Directory.

The distributed installation configuration system and method of the present disclosure, in one embodiment, stores all installation information for all the machines into a single or replicated directory, which may then be used by an installation program on other machines to retrieve information needed for that particular installation automatically. For instance, the distributed installation configuration system and method allow a user to answer questions related to a product installation, which answers then will be saved in a repository. This repository can be accessed, subject to applicable security controls, from any additional machines at any time. Any installation programs running on any other machines can read from this repository and answer the questions needed for the install to take place on that machine.

In addition, in one embodiment, the information stored in the repository may be reconfigured to allow modifications to the first configuration. For example, a user may want to move the installation to other machines or change settings on a particular machine. In such cases, the user can re-run the installation. Re-running the installation with different configuration will update the information in the repository that was stored during the previously installation. When the information is updated with new configuration, the user will be notified of the machines that need to be updated for the new changes to take effect.

Having a repository of installation information reduces repeatedly asking similar questions and also allows a user to continue with the install at any time without having to answer the same questions. In the following description, the system and method of the present disclosure will be described in conjunction with installing an IAM (identity and access management) suite of products, as an example only. Thus, it should be understood that the system and method of the present disclosure is not limited in its use to the IAM products, but rather may be used to install any other products or suite of products.

FIG. 1 is a system architectural diagram illustrating the distributed installation configuration of the present disclosure in one embodiment. A directory system agent (DSA) 114 is created after the installation of a product suite directory 102 such as a Directory Service, on the first machine 104. A directory has a stored collection of users, user passwords, and usually, information about what systems and services the users can access and types of policies. Policies are operating rules that are used to control access to and priorities for the use of resources. When the installation has been run all the answers to the questions, including generic questions for the secondary machines, are loaded into the directory 102 using, for example, JNDI (Java Naming and Directory Interface) calls. The schema that is used in the directory 102 may be customized for the IAM install but can be modified to have any entry the user desires.

In one embodiment, the directory entries are setup with an attribute that tells the installation on which machines the products should be installed or modified. When the installation is run on a secondary machine 106-112, more JNDI calls gather the relevant information from the original machine 104 where the directory 102 was installed. The installation program or module running on the secondary machine 106-11 may, for instance, prompt the user, for example, "welcome, we have detected that you are going to install product A on this machine, please click next to continue installation."

The user then only needs to answer local questions such as installation location on that machine. The installation program running on that secondary machine then installs and informs the user what machine to install on next and how many to go. The local questions, for instance, are those that are not included in the first installation process and may pertain to machine specific information such as operating system specific questions.

In one embodiment, rerunning the installation on the first machine 104 updates the directory information 102. Using various attribute information stored in the directory 102, for instance, a reference count, the distributed installation configuration system and method of the present disclosure, in one embodiment, then determines other secondary machines that are affected by this update and prompts the user to rerun the installation in those secondary machines as well. In another embodiment, the directory may be stored as a part of a separate server, for example, a web server that can be accessed by a plurality of machines or platforms.

Figure 2:
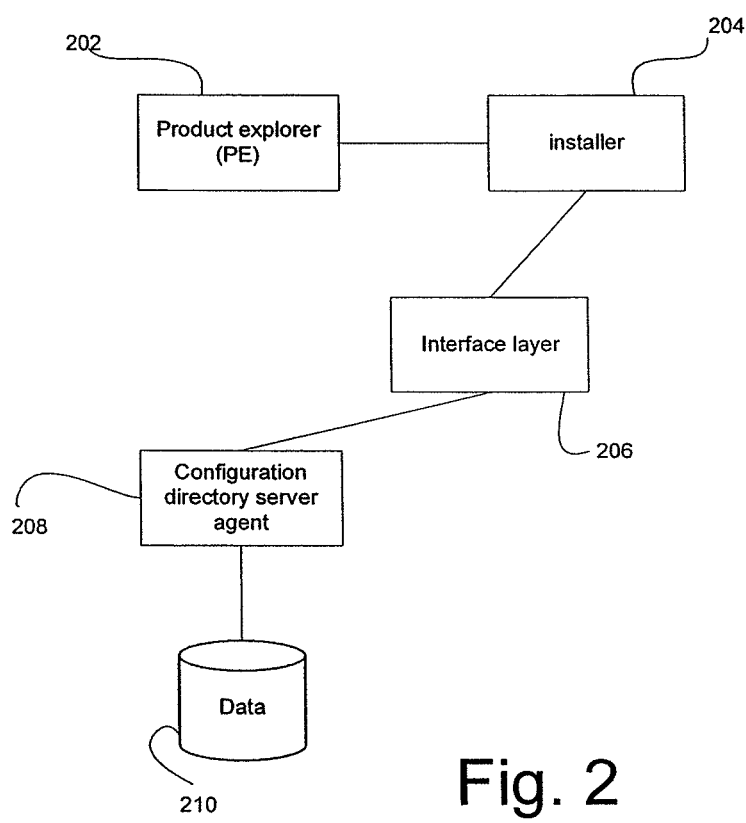
FIG. 2 is a block diagram illustrating the components of the distributed installation configuration system in one embodiment.

FIG. 2 is a block diagram illustrating the components of the distributed installation configuration system in one embodiment. The system in one embodiment includes a product explorer module (PE) 202, an installer module 204, a configuration directory system agent (DSA) 208, and an interface layer module 206. PE 202, in one embodiment, is the entry point of the distributed installation configuration system. PE 202 functions as an initial user interface for the product installation, for example, IAM installation, and launches the installer module 204. PE 202 also may provide links to useful websites so that a user can browse through the information presented by the PE 202 before clicking the "install" button, which will launch the installer module 204. Under Windows™ operating system, PE 202 may be built using the DemoShield™ development tool.

In one embodiment, the PE 202 may be enabled to execute individual install programs such as the install programs for the IAM point products. In addition, the PE 202 may be enabled to execute a post-installation program that updates the directory information and configuration 208 210 (also referred to as IAMConfig) with the relevant point product information. This may also trigger another process that updates the IAM GUI to include the new point product. Point products are individual products that can be integrated with each other via the central integration point of IAM. Each IAM point product makes use of IAM common components described above.

The install module 204 is launched by the PE 202 in one embodiment, and provides a detailed user interface for gathering installation information from the user. For example, the installer module 204 may ask the user a series of questions about where and how the user would like to install the IAM common components. These questions may cover not only the products that are going on the current machine, but also all products on all machines, giving the install module 204 a suite-wide view of the user's requirements. The install module 204 coordinates the launch of black-box installers for the various common components of a product suite, such as the IAM common components and configures selected files and/or settings on one or more target machines.

Once the questions have been answered, the installer module 204 can install the products associated with the role(s) assigned to the current machine immediately. These products, for example, are installed by their normal installers, driven in silent mode by the installer module 204. Since the user has already described the overall suite to the installer module 204, it is able to configure the products it installs with any information each product requires in order to connect to the remote products, which have not yet been installed.

In one embodiment, a first machine on which the PE 202 and the installer module 204 is run is assigned a role that contains a Directory Backbone, and once the questions have been answered, the installer module 204 installs and configures the appropriate machine roles and IAMConfig. Thus, in this embodiment, the IAMConfig is running before the first installation exits, for instance, so that the information about the overall layout of the suite that the user entered in stored in the IAMConfig.

Information about any other common components that were selected to be installed on additional machines are also registered in the IAMConfig. On the second and subsequent machines in the suite, the installer module 204 is pointed, for instance, by the user, at the IAMConfig created on the first machine. This information may then be used to automatically answer the questions on the second and subsequent machines, eliminating the need for the user to re-answer questions. The install module 204 may be built using either InstallShield Developer 8™ or InstallShield MultiPlatform™ 5.0.

DSA 208 (e.g., IAM Configuration DSA) in one embodiment is created and configured by the installer module 204 and is used to store installation and configuration information about the current product setup such as the IAM setup in a storage 210. For instance, on each machine assigned the role of Directory Backbone, the installer module 204 sets up the IAM Configuration (IAMConfig) DSA 208. The IAMConfig DSA 208 will take the information gathered during the installation process, for example, ports, hostnames, etc., and store the information using a common schema.

The IAMConfig DSA 208 may contain sensitive information such as the administrative passwords, which require protection. The IAMConfig DSA 208, thus in one aspect, may include password authentication, for instance, using a password set by a user when the user initially runs the installer.

The interface layer module 206 is used to communicate between the installer module 204 and DSA 208. The interface layer module 206 allows the installer module 204 to access the data stored in the DSA 208. The interface layer module 206, for instance, makes connections to the configuration DSA 208, update and retrieve relevant information needed for the installation, for example, by the installer module 204. Further, point product individual installer programs may use the interface layer 206 to communicate with the configuration DSA 208. The interface layer 206 may communicate with the directory system agent 208 either using the command-line tool DXTools as described above, or by linking against an LDAP library. In one embodiment, the interface layer 206 also handles encryption of password information that is kept by the configuration DSA 208. A cryptographic library such as PKIs (public-key infrastructure) may be linked against the interface to handle the encryption.

The storage 210 may include any data repository device currently known or will be known in the future that is capable of storing data. For instance, the storage 210 may store directory using a database such as Ingres™. Thus, IAMConfig may comprise a DSA 208 and related repository 210.

As described above, the product explorer (PE) 202, functions as an initial user interface and performs such functions as displaying appropriate branding graphics, giving the user overview information about the products on the product distribution and installation medium such as the CD, allowing the user to browse the documentation on the CD without installing anything, and launching the actual installers. PE 202 may be enabled to launch various point product installations, and also have an additional function of informing the common components that a new point product has been installed, further automating the installation of point products. Under different operating systems such as UNIX, the product explorer 202 may be skipped altogether and the installer module 204 launched directly.

The product explorer (PE) 202 presents a plurality of different screens to the user. For instance, the top-level view displays a brief write-up of what IAM is, and an button to launch the installer module 204. Below that, there may be a menu of the various IAM machine roles, and the user can click on each to get a description of how that role relates to the overall IAM installation. There are also screens that list documentation, which can be browsed, for example, using a document reader such as Adobe Acrobat™. User may also browse the CD via one of the screens provided by the PE 202.

PE 202 also may be enabled to retrieve information about the point products that are installed manually, for example, by communicating with a back end that stored information during the manual install process.

Figure 3:
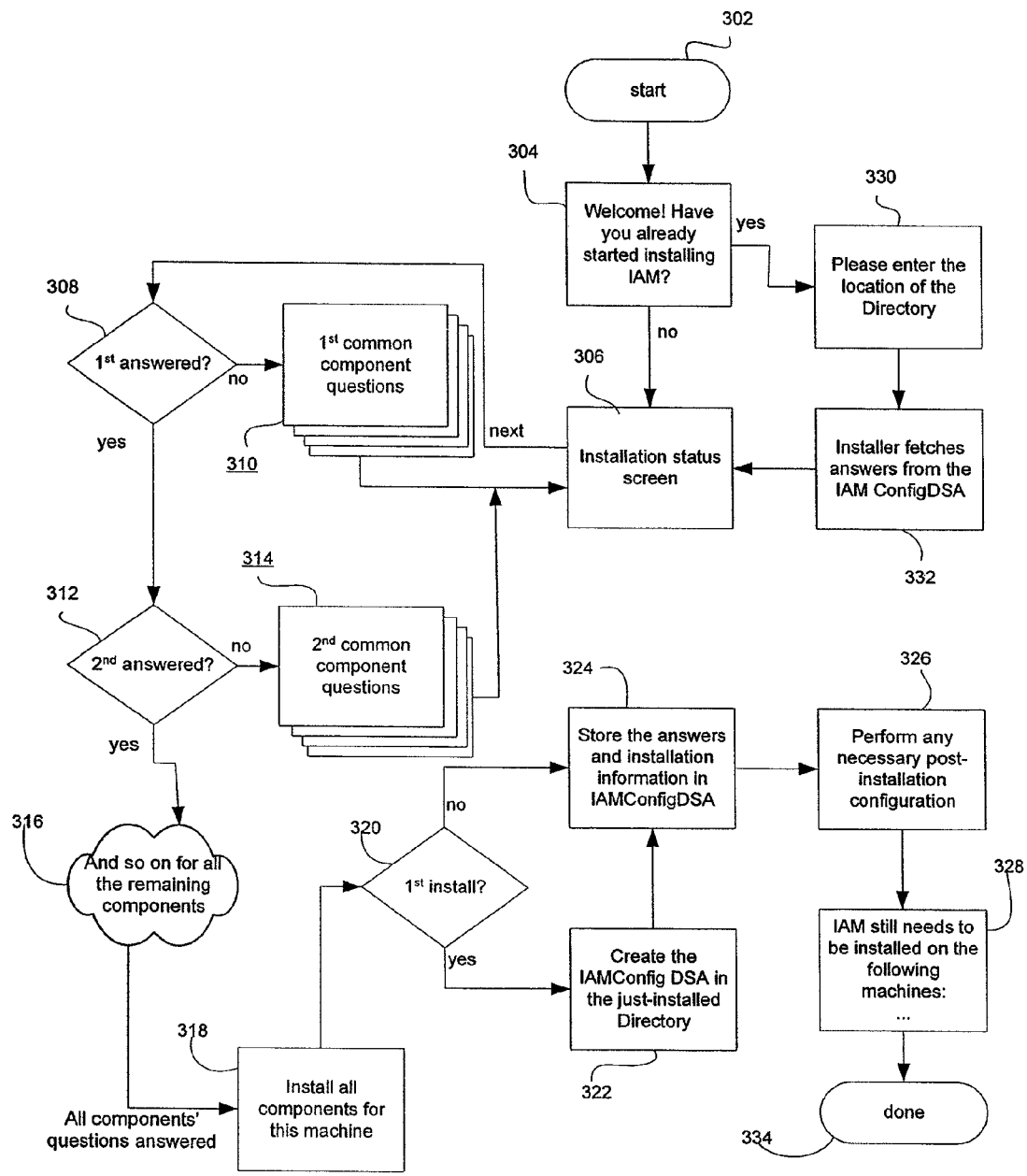
FIG. 3 is a flow diagram illustrating a functional flow of the installer module in one embodiment.

The installer module 204 performs the actual installation of all the common component products over multiple machines. FIG. 3 is a flow diagram illustrating a functional flow of the installer module in one embodiment that is enabled to install multiple machine role components, for example, of an IAM suite of products across one or more machines or platforms. During the initial interaction with the installer, the user assigns roles to specific machines, either local or remote. In this embodiment, one Directory Backbone or a role that includes a Directory Backbone (for example, an Identity Server or an Access Server) is being installed on the local machine. Any other instances of the five roles can be on either the local machine or remote machines. In this embodiment, the installer collects all the information from the user about all the common components of products being installed.

Figure 4:
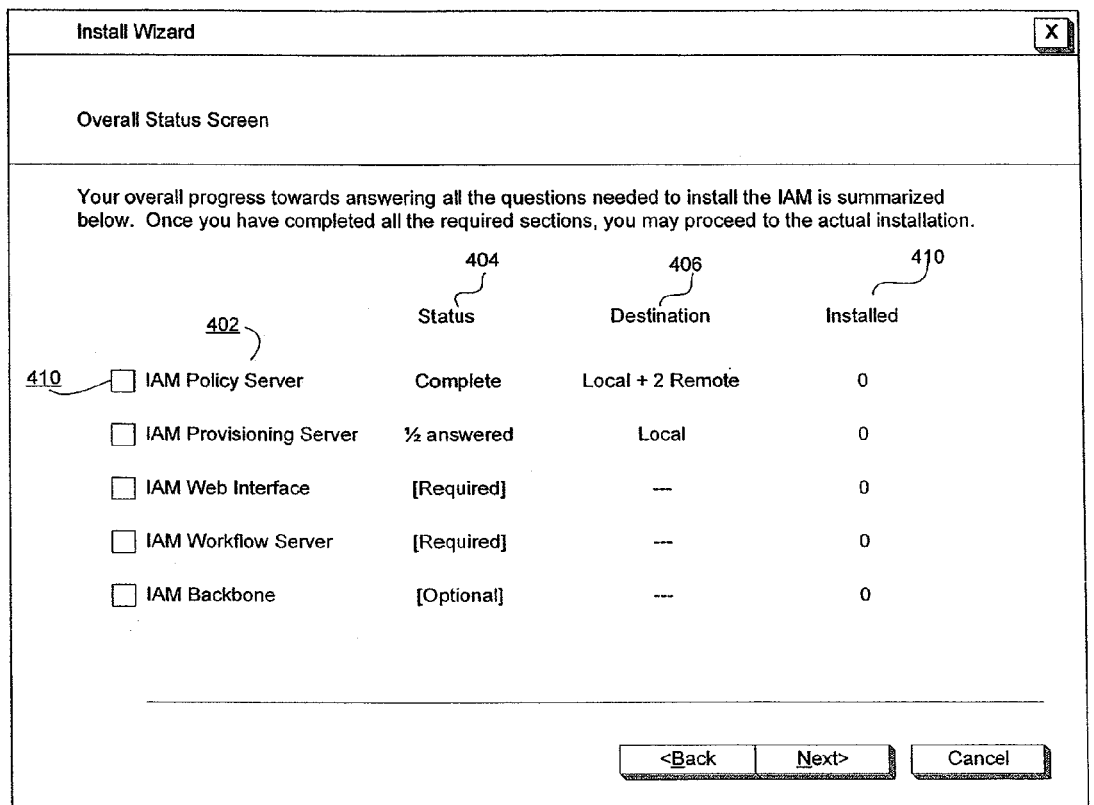
FIG. 4 illustrates an example of an installation status screen in one embodiment.

Referring to FIG. 3, on launching the first install at 302, a user is asked whether this is a first install at 304. If it is the first install, the user is presented with an installation status screen at 306. An example of an installation status screen is shown in FIG. 4. Referring to FIG. 4, the installation status screen 400 shows, for instance, a list of products or machine roles 402 to install. The list, for example, may be obtained from the product distribution CD. For each product or machine role, status 404 of installation is also shown, for instance, as completed, half completed, etc. The destinations field 406 shows the target machine or machines on which the products are installed or will be installed. The installed field 408 shows the number of the product installed. A user may be able to configure a selected number of products or machine roles by, for example, clicking on a "configure now" button 410 associated with the product. In addition, the status screen 400 may be set up so that clicking a button or clicking on the product name or machine role would further drill down and display a list of components that are associated with the product name or machine role. Similar status information would then be shown for the list of components, as well as an option to enter answers for specific components or configure specific components in the list.

Referring back to FIG. 3, a user may select a product or machine role to install from the status screen shown at 306. As part of the installation process, the user may select one or more machines or platforms on which the user wishes to install each group of products. A single machine can have several distinct roles, and any role can be duplicated over multiple distinct machines to provide load balancing and failover for those roles, with an exception of the Web Server IAM machine role in one embodiment. During the initial interaction with the installer, the user assigns roles to specific machines, either local or remote, for instance, using the status screen. For an IAM suite of product installation, for example, one server that includes a Directory Backbone is installed on the local machine, and any other servers and any instances of the other four roles can be either on the local machine or remote machines. In one embodiment, an Identity Server or an Access server machine role is chosen for the local machine.

At 308 and 310, questions relating to a first common component for a product chosen to be installed is asked. After answering a question or a group of questions, an updated status screen may be presented to the user at 306. Thus, for example, the status screen that summarizes what the user has answered and what still needs to be answered may be displayed periodically, for instance, between each product's set of questions. Optionally, a panel may be provided on the side of the window at all times to indicate the user's progress against a fixed list of stages in the installation.

The process of collecting of information for the first common component continues at 308, 310, and optionally at 306. When the information relating to the first common component is collected from the user, questions relating to a second common component for the product chosen is asked at 312 and 314 in the similar manner. At 316, the collecting of information continues for the remaining components of the product selected to be installed.

In one embodiment, the installation information needed for a given component or product that can be taken or inferred from answers the user has already provided in relation to another component or product are reused, thus the user is not presented with a question that the user already answered. This may be done, for example, by using a schema that assigns name-value pair data for information already collected. Thus, before asking another question, a determination is made as to whether that name-value pair data already has data assigned to it. If so, a question about this information would not be asked again.

Once the questions have been answered, all the products that are to reside on the local machine are installed at 318 using the collected information. This may be done, for example, by running the individual products' installers in silent mode with appropriate command-line parameters. For those products to be installed on different machines or platforms, the installer module may be physically run on multiple machines individually, in one embodiment. In another embodiment, the products may be installed remotely.

After installing the products, in one embodiment, a DSA is set up in the Directory, for instance, using a directory tool that may be provided by an IAM application, and the information that the user provided to the installer is stored in this DSA, available for subsequent installations. DSA may include a process and a database to store information. For example, at 320, it is determined whether this is the first install for this component. If it is the first time this component is being installed on this local machine, Config DSA (DSA configuration or DSA) is created at 322 and the process continues to 324. If at 320, this is not the first time this component is being installed, the information collected from the user and the installation information is stored in the already created Config DSA at 324. At 326, post-installation configuration is performed, if any. Post-installation configuration may include, for example, starting the Config DSA. At 328, the user is informed of which products are remaining to be installed on which machines. A user interface screen may be presented to the user for that purpose. For instance, the installer module may display a final screen when the installation for the current machine is complete, listing the remaining machines still to be updated. Optionally, the user may be enabled to select automatic remote installation of the products the user selected to install on user selected remote machines.

In the embodiment in which individual installation takes place in each of the selected remote machines or platforms, the distribution CD may be taken from machine to machine, and for the second and subsequent installation, the installer module consults the Config DSA, checks the local hostname, and displays a dialog summarizing which products the user chose to install on this machine. The user only needs to provide the last few pieces of information that was not acquired initially, if any, for instance, the install location, which is most easily done with a file browser over the local file system, and the products destined for that machine are then installed. After installation, Config DSA is updated with the installation information from these machines.

Because the overall plan of what products are going to be installed where is chosen before any installation is performed, for example, when the user enters the information on the status screen, the installer is able to set up each product with any required information to allow the common component products to communicate with one another without any manual user configuration.

At 330, if it is not the first time the user is running the install module, the user is prompted to enter a location, for instance, a name of the machine and directory, where the machine role having the initially installed Directory Backbone is installed. At 332, the installer module retrieves information saved in the configuration (Config DSA) about the installed components and products from the specified machine and continues to 306.

Any time during the answering of the questions, for example, at 308, 310, 312, 314, 316, the user may stop the installation process and resume answering questions again at a later date or time. In one embodiment, the answers so far may be saved to a local temporary directory. On launching the installer again, the installer checks for the presence of this saved file and provides the user with an option to load the answers, if present. The user may at that point decide to keep the answers, or start the answering process over.

In one embodiment, the user may be allowed to change their installation decisions even after starting to install some of the products in the suite of products, or even after completing the installation of all the products in the suite. In this case, the user is allowed to re-answer some of the questions or provide new information to the installer module. An option may be provided on a user interface screen for the user to select to re-answer or provide new information. The installer module then determines which products are affected by the new information. Further, the installer module determines, for instance by using the timestamp information in the Config DSA, which machines need updating as a result of the new information supplied by the user. The user is then notified which machines need to be updated.

If the user changes the machines on which particular roles are deployed, the Config DSA may again be consulted to determine which configuration information for which common components need to be updated. The list of machines that need updating are then presented to the user. In addition, the installer module automatically determines the order in which the plurality of products are to be installed as well as calculating the amount of space needed for each installation.

In one embodiment, the user is provided with an option to uninstall the common components, for instance via a status screen similar to the one shown in FIG. 4. If a user attempts to uninstall one of the common components products individually, the user is given the choice of uninstalling the entire suite of products or not proceeding with the uninstalling. If the suite is uninstalled, the Config DSA is updated to indicate that every machine requires updating, and the installer guides the user to the remaining machines as was done during the installation procedure.

Configuration directory system agent (FIG. 2 208), also referred to as Config DSA, holds information about the overall product suite, for example, an IAM suite of products. This information is made available for the installer module to streamline the installation process as described above. The DSA also may store any other information that my be useful for future applications, such as the information useful for technical services to get an overview of the overall suite of products, for instance, when diagnosing problems with an installation.

Some examples of the information collected in the DSA may include, but is not limited to, for each machine role, locations, ports, version, authentication information such as the usernames and passwords, whether installed or not installed, installation options, and name-value pairs as information to feed to the installer module on the second and subsequent runs.

The DSA contains authentication information for the various products in the product suite and therefore, may be password protected. The password fields may also be encrypted using the DSA password, that is, another password to protect the data. In one embodiment, any password that are stored in the DSA may be encrypted and marked as octet strings in the DSA. The passwords that are stored in the DSA may include Admin and policy server passwords, or passwords for accessing other components of the application. They may then be encrypted/decrypted at the user end by the installer, for instance. In one embodiment, the data communicated between the installer module and the DSA via the interface layer may be encrypted, for instance to prevent unauthorized reads, and signed, for instance to prevent unauthorized modifications, prior to transmission.

The interface layer (FIG. 2 206), also referred to as Config Interface, sits between the installer module (FIG. 2 204) and the DSA (FIG. 2 208). The interface layer may be implemented as a DLL (data link library) providing custom actions for whatever system the installer module is developed under. The interface layer may also be a shell script wrapper for a binary such as the Directory binary "dxtools," or a binary itself.

The interface layer allows the installer module to access the data stored in the config DSA. An example of a syntax for the interface call may be: assign_iamconfig_data (directory_machine, "INSTALL_LOCATION", "c=AU, o=CA, ou=IAM, cn=AccessControl", 'install_location'). This call causes the interface layer to read the current value of the INSTALL_LOCATION property, connect to the Config DSA port on the selected machine, and submit the value to the given attribute of the entry with the given distinguished name. Distinguished name refers to a name that uniquely identifies an object in a directory. The distinguished name includes the entry's relative distinguished name, plus the names of container objects and domains that contain the entry (an item stored in the directory). Also, the distinguished name uniquely identifies an entry's location in a tree. An example of a distinguished name is: "cn=Peter Smith, ou=Accounts, ou=MyCorporation, c=US". In another embodiment, the installer module may pass string data structures to the DSA so that DSA can return the string data structures with appropriate values. The installer module than may assign the returned values to variables in the installer module.

In one embodiment, the interface layer is passed the following parameters: a flag indicating which way the data should flow (from the DSA to the installer module, or from the installer module to the DSA); a URL-style designation giving the machine name and port number where the Config DSA is running and the "base" Distinguished Name; a string providing the distinguished name of the data in the DSA; a username and password for the DSA; a string which names the Java bean in the installer module to equate with the data in the DSA, for example, depending on the mode in which the interface is called, the values of the properties in the bean are transmitted to the DSA, or the DSA is read and the values retrieved are assigned to the bean's properties; a list of properties which should be treated as local, for example, if all other properties are considered to be global.

The interface layer 206 may be written as a Java Bean and have access to the JNDI (Java Naming and Directory Interface) to perform the LDAP communication with the DSA 208. When reading from the DSA 208, the installer module 204 may use the parameters passed in by the interface layer 206 to fetch both the global entry for a given product and the local entry with the same common name (cn) as the current hostname, and merges the data into a single value of each attribute, taking global attributes from the one and local attributes from the other. These attributes are then assigned to the nominated Java Bean.

When writing to the DSA 208, the reverse occurs. The interface layer 206 reads the current values of the various properties from the nominated Java Bean, and creates two modify requests, one applicable to the global entry and one applicable to the local one.

Figure 5:
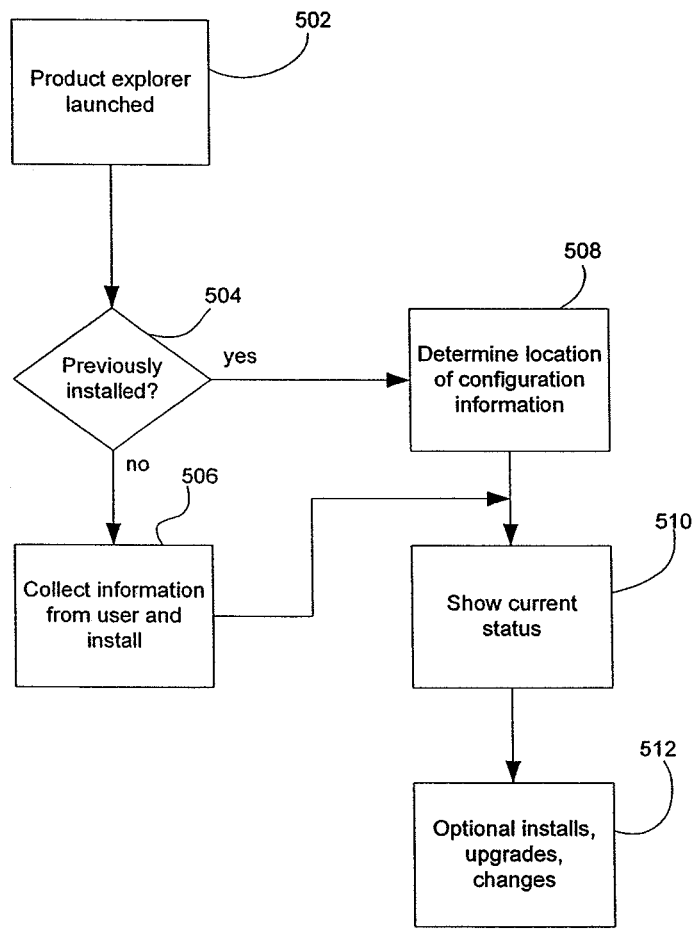
FIG. 5 is a flow diagram illustrating the distributed installation configuration method in one embodiment.

FIG. 5 is a flow diagram illustrating the distributed installation configuration method in one embodiment. At 502, the product explorer is launched, for example, when a product CD is inserted into a machine. The product explorer allows the user to read information about the common components in the product suite and the documentation about the product suite, in one embodiment. The product explorer, for example, may display appropriate branding graphics, provide the user overview information about the products on the installation disk, allow the user to browse the documentation on the installation disk without installing, and launch the actual installer. Two main options on the product explorer may include: 1. install a read (for use with the documentation); 2. launch the installer module. The product explorer, in one embodiment, is a centralized information area to help the user to get familiarized with what the product suite is and how it can be configured and installed.

The product explorer may present a number of different screens to the user. At any point, the user may click the install option to launch the installer module. In one embodiment, the top-level view displays a brief write-up of what IAM (or any other product suite) is. There may be an option to display information about the various IAM machine roles, and the user may click on each to get a description of how that role relates to the overall IAM installation. There may also be screens where the document is listed and can be browsed, for instance, using a third party document reader. The user may also have an option to browse the CD.

The installer module performs the actual installation products over the machines nominated by the user. On launching the first install, information about all the common components for a product suite is solicited from the user. As part of this process, the user may nominate on which machine(s) to install each group of products.

For instance, at 504, when the user launches the installer module, the user will be presented with a screen asking if the user wishes to install the suite of products on just the local machine, or on multiple boxes. If the user selects multiple boxes, the user is further presented with a screen asking if any of the suite of products were installed previously, and if so, to enter the location of one of their directory backbone machines, for example, the machine on which the user started the installation process.

The installer then proceeds to one of several possible views, depending on the context. If the user indicated that no previous installation was done, the user is asked a plurality of questions, and the installation process begins with those products that can be installed on the local machine at 506.

After installing, a DSA ("IAMConfig") is set up in the Directory, and all the information that the user provided to the installer is stored in this DSA, available for subsequent installations. The Directory, for instance, is installed as part of the installation process in the current machine, for example, so that the Directory service is available to provide a place for all the information the user has entered to be saved before the first run of the installer module exits.

If the user has previously started installing the same suite of products, the installer module fetches information from the Config DSA at 508 and the user is presented with the status screen showing the current status at 510. If the products in the suite have not been installed on the current machine or the installer module determines that the products installed on the current machine need updating, the user has the option to proceed with that stage of the installation or update at 512.

From the status screen, the user may have an option of modifying the installation by changing the previously supplied answers regarding any or all of the products. This may result in products needing to be updated on one or more machines. The installer module automatically determines whether machines need to be updated based on the new information and prompts the user accordingly.

The user is also provided with an option to uninstall the entire suite of products. When the user selects to uninstall, the user is guided to each machine upon which the un-installation "update" needs to be executed. In addition, the installer module may be enabled to install upgrades and patches to the installed product and also update the information stored in the Config DSA accordingly.

As described above, the DSA holds, inter alia, information about each product installed in the suite. The specific data fields may be specified in a custom schema. In one embodiment, this schema may define a single object class, "commonComponents," and an auxiliary object class for each product which extends the base commonComponents class to also contain the product-specific data. The data defined for the commonComponents object class may include, but is not limited to Hostnames, Version, installLocation, commonName. The data defined for the commonComponents object class may also include: ToBeUpdated, ToBeRemoved, Documentation, DateInstalled, AdditionalInfo, InstallUserName, InstallOrganization, PatchLevel, ProductDependencies.

Particular fields of both the commonComponents and auxiliary classes are nominated as either global or local by the interface layer, for example, when it is loaded or read. This distinction is made to determine if a single value applies for every installation of a given product across the entire suite (such as Hostnames, the list of every machine in the suite on which this product is installed), or may be different for each individual machine's installation (such as installLocation, the location on a given machine's file system where the product is installed).

In one embodiment, global information for a given product is stored in an entry of the appropriate object class. For example, an Admin server's global information is stored in the entry with the distinguished name of cn=IAMAdminServer-global, ou=IAM, o=CA.

In one embodiment, local information is stored in multiple entries, one for each machine upon which the product is installed. These entries are named by their product name and machine in one embodiment. For example, the entry describing the local information pertaining to the Admin Server on the machine QA59805.ca.com would have a distinguished name of cn=qa59805.ca.com, ou=IAMAdminServer-local, ou=IAM, o=CA.

In one embodiment, information appears in both the global and local entries because they are of the same object class. In one embodiment, it is up to the interface layer to decide which piece of data applies to a particular machine. Thus, the distinction is associated with that component. The interface layer fetches both the global entry for a given product and the local entry with the same common name (cn) as the current hostname, and merges the data into a single value of each attribute, taking global attributes from the one and local attributes from the other.

In one embodiment, some information may apply to entire roles rather than individual products. The Hostname is one example. Since all products that are part of a given role may be installed together, the list of machines that a given product has been installed on can be inferred by looking at the lists of machines that the roles that product is part of have been installed on. For convenience, one product in each role may be chosen to represent the entire role.

The system and method of the present disclosure, in one embodiment, allows a user to answer questions about an install, which is saved in a repository. This repository can be accessed, for instance, subject to applicable security controls, from any additional machine at any time. An installer module can then be run on any other machine and will read from this repository and automatically provide answers needed for the install on that machine. The repository further may store other information needed for matters other than installing.

The system and method of the present disclosure may be implemented and run on a general-purpose computer. For example, the system and method may be implemented as a set of computer instructions to be stored on computer memory units and executed on the computer processor. The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer implemented distributed installation configuration system, comprising:
an installer module operable to, by a processor, collect information needed for installing a plurality of product components on one or more machines before installing the plurality of product components, the installer module operable to install the one or more of the plurality of components; and a configuration agent module operable to, by a processor, store and manage the collected information after the installer module collects the information, the configuration agent module operable to provide data associated with the collected information, the installer module further operable to determine whether the plurality of product components are being installed for the first time, and if the plurality of product components are being installed for the first time, the installer module further operable to create the configuration agent module that can store and manage information for installing one or more product components on one or more machines after at least a first installation;

if one or more of the plurality of product components were installed previously, the installer module further operable to determine a location of the configuration agent module containing information based on at least a previous installation, retrieve the collected information from the configuration agent module, continue with installing one or more of the plurality of product components using the collected information.

2. The system of claim 1, wherein the installer module is further operable to store additional information collected during one or more subsequent installation of one or more of the plurality of product components in the configuration agent module.

3. The system of claim 1, wherein the configuration agent module is located centrally.

4. The system of claim 1, wherein the one or more product components are installed on a plurality of machines.

5. The system of claim 1, wherein the one or more product components are distributed installed across a plurality of machines in a network.

6. The system of claim 1, wherein the configuration agent module is further operable to update the collected information.

7. The system of claim 1, further including:
a user interface module operable to provide a list of products and associated components to install, the user interface module further operable to invoke the installer module.

8. The system of claim 1, wherein communications between the configuration agent module and the installer module are encrypted.

9. The system of claim 1, wherein the installer module is further operable to provide updated installation progress as the installer module is collecting the information.

10. The system of claim 1, wherein the location is a port number of a server associated with the configuration agent module.

11. A distributed installation configuration method, comprising:
determining, by an installer module, whether one or more product components associated with a suite of products being installed were previously installed on one or more local or remote machines;

if one or more product components associated with a suite of products being installed were previously installed, determining a location of a configuration system agent containing information based on at least the previous installation, retrieving information related to current installation being performed on a current machine from the configuration system agent, obtaining a set of localized information from a user, and installing one or more product components on the current machine using the retrieved information and the set of localized information;

if one or more product components associated with a suite of products being installed were not previously installed, obtaining information associated with all product components in the suite of products being installed, creating a configuration system agent that can store and manage information for installing one or more product components on one or more machines after at least a first installation and storing the information with the configuration system agent, and installing on a current machine, by the installer module, one or more product components selected for the current machine using at least some of the information.

12. The method of claim 11, further including:
providing a list of additional machines on which the one or more product components need installation based on the information in the configuration system agent.

13. The method of claim 11, wherein the location of the configuration system agent is centralized.

14. The method of claim 11, wherein the location of the configuration system agent is a port number of a server associated with the configuration system agent, wherein local or remote or both local and remote processes can connect to the port number for communicating with the configuration system agent about the information.

15. The method of claim 11, further including:
updating the information in the configuration system agent; and
determining which machine installations are affected by the update.

16. The method of claim 15, further including:
notifying a user about the machine installations determined to be affected by the update.

17. A non-transitory storage device, tangibly embodying a program of instructions executable by the machine to perform a distributed installation configuration method, comprising:
determining whether one or more product components associated with a suite of products being installed were previously installed on one or more local or remote machines;

if one or more product components associated with a suite of products being installed were previously installed, determining a location of a configuration system agent containing information based on at least the previous installation, retrieving information related to current installation being performed on a current machine from the configuration system agent, obtaining a set of localized information from a user, and installing one or more product components on the current machine using the retrieved information and the set of localized information;

if one or more product components associated with a suite of products being installed were not previously installed, obtaining information associated with all product components in the suite of products being installed, creating a configuration system agent that can store and manage information for installing one or more product components on one or more machines after at least a first installation and storing the information with the configuration system agent, and installing on a current machine one or more product components selected for the current machine using at least some of the information.

18. The program storage device of claim 17, further including:
   providing a list of additional machines on which the one or more product components need installation based on the information in the configuration system agent.

19. The method of claim 1, further including:
   an interface module operable to provide communications between the installer module and the configuration agent module.

20. The method of claim 1, wherein if one or more of the plurality of product components were installed previously, the installer module further operable to determine a location of the configuration agent module located on a local machine.

21. The method of claim 1, wherein if one or more of the plurality of product components were installed previously, the installer module further operable to determine a location of the configuration agent module located on a remote machine.

* * * * *